(12) United States Patent
Cain et al.

(10) Patent No.: US 9,494,270 B2
(45) Date of Patent: *Nov. 15, 2016

(54) SYSTEMS AND METHODS FOR LOCATING AND RESTORING SERVICE LINES IN PIPELINE REHABILITATION

(71) Applicant: WPW, LLC, Breckenridge, CO (US)

(72) Inventors: John A. Cain, Fairplay, CO (US); Harry L. Baum, Breckenridge, CO (US); James D. Keigley, Silt, CO (US); Ralph K. Cordonnier, Buena Vista, CO (US); Dan Cohen, Breckenridge, CO (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/865,813

(22) Filed: Apr. 18, 2013

(65) Prior Publication Data
US 2013/0233428 A1 Sep. 12, 2013

Related U.S. Application Data

(63) Continuation of application No. 12/363,782, filed on Feb. 1, 2009, now Pat. No. 8,567,449.

(60) Provisional application No. 61/025,627, filed on Feb. 1, 2008.

(51) Int. Cl.
*F16L 55/16* (2006.01)
*F16L 55/165* (2006.01)
(Continued)

(52) U.S. Cl.
CPC ............ *F16L 55/165* (2013.01); *F16L 55/179* (2013.01); *F16L 55/265* (2013.01); *F16L 55/48* (2013.01); *F16L 2101/70* (2013.01)

(58) Field of Classification Search
CPC ..... F16L 55/11; F16L 55/124; F16L 55/165; F16L 55/18; F16L 55/48; F16L 2201/60
USPC .......... 138/104, 98; 624/345, 346; 324/345, 324/346
See application file for complete search history.

(56) References Cited

U.S. PATENT DOCUMENTS 3,532,132 A 10/1970 Rubenstein
4,893,389 A * 1/1990 Allen et al. ................ 29/890.11
(Continued)

FOREIGN PATENT DOCUMENTS

CN 1858477 A 11/2006
DE 10204205 A1 8/2003
(Continued)

OTHER PUBLICATIONS

PCT International Search Report and Written Opinion, Application No. PCT/US2009/0382784, Apr. 20, 2009.
(Continued)

*Primary Examiner* — James Hook
(74) *Attorney, Agent, or Firm* — Wilmer Cutler Pickering Hale and Dorr LLP

(57) ABSTRACT

Embodiments of the present invention include a system for locating and restoring service lines during pipeline restoration. According to some embodiments of the present invention, the system includes a movable chart, a plug with a marking magnet, and an attachment part. In some embodiments of the present invention, the movable cart is deployed along the inside of a pipeline. In some embodiments, the attachment part is movably coupled to the movable cart. The attachment part is configured to install a plug into the service line at a location where the service line intersects the pipeline, according to some embodiments. In other embodiments, the attachment part is configured to mark the location of the plug in the service line and remove the plug from the service line to restore a fluid connection between the service line and the pipeline.

7 Claims, 17 Drawing Sheets

(51) Int. Cl.
  *F16L 55/179* (2006.01)
  *F16L 55/48* (2006.01)
  *F16L 55/26* (2006.01)
  *F16L 101/70* (2006.01)

(56) References Cited

U.S. PATENT DOCUMENTS

| | | | |
|---|---|---|---|
| 4,968,934 A | 11/1990 | Robinet et al. | |
| 5,074,365 A * | 12/1991 | Kuckes | 175/40 |
| 5,167,258 A * | 12/1992 | Rice | 138/98 |
| 5,333,649 A * | 8/1994 | Shimokawa et al. | 138/89 |
| 5,333,749 A | 8/1994 | Schellenberg | |
| 5,454,401 A * | 10/1995 | Kamiyama et al. | 138/98 |
| 5,485,089 A * | 1/1996 | Kuckes | 324/346 |
| 5,532,598 A * | 7/1996 | Clark et al. | 324/326 |
| 5,566,719 A * | 10/1996 | Kamiyama et al. | 138/98 |
| 5,577,528 A | 11/1996 | Saha et al. | |
| 6,024,515 A | 2/2000 | Konwinski et al. | |
| 6,085,794 A * | 7/2000 | Kamiyama et al. | 138/98 |
| 6,158,473 A * | 12/2000 | Kamiyama et al. | 138/98 |
| 6,167,913 B1 | 1/2001 | Wood et al. | |
| 6,807,987 B2 * | 10/2004 | Hill et al. | 138/104 |
| 6,917,176 B2 * | 7/2005 | Schempf et al. | 318/568.11 |
| 7,131,791 B2 | 11/2006 | Whittaker et al. | |
| 7,669,614 B2 | 3/2010 | Cohen | |
| 7,841,366 B2 | 11/2010 | Bryant et al. | |
| 8,567,449 B2 * | 10/2013 | Cain et al. | 138/98 |
| 8,646,520 B2 * | 2/2014 | Chen | 166/66.5 |
| 2001/0000874 A1 * | 5/2001 | Stephens | 138/98 |
| 2001/0029989 A1 * | 10/2001 | Paz | 138/104 |
| 2003/0047226 A1 | 3/2003 | Hill et al. | |
| 2004/0175235 A1 | 9/2004 | Whittaker et al. | |
| 2005/0092382 A1 | 5/2005 | Muhlin | |
| 2008/0178403 A1 | 7/2008 | Bryant et al. | |
| 2008/0213047 A1 | 9/2008 | Bryant et al. | |
| 2008/0314468 A1 * | 12/2008 | Houghton | 138/89 |
| 2010/0037969 A1 * | 2/2010 | Fierst et al. | 138/89 |
| 2011/0155273 A1 * | 6/2011 | Cain | 138/97 |
| 2013/0156506 A1 * | 6/2013 | Dalby | 405/184.2 |

FOREIGN PATENT DOCUMENTS

| | | |
|---|---|---|
| EP | 0253588 A1 | 1/1988 |
| WO | WO-2009097598 A1 | 8/2009 |

OTHER PUBLICATIONS

European Search Report mailed on Apr. 22, 2014 in European application No. 09706594.0, filed Feb. 1, 2009, 6 pages.
EPC Communication mailed on Oct. 5, 2015 in European application No. 09706594.0, filed Feb. 1, 2009, 4 pages.

* cited by examiner

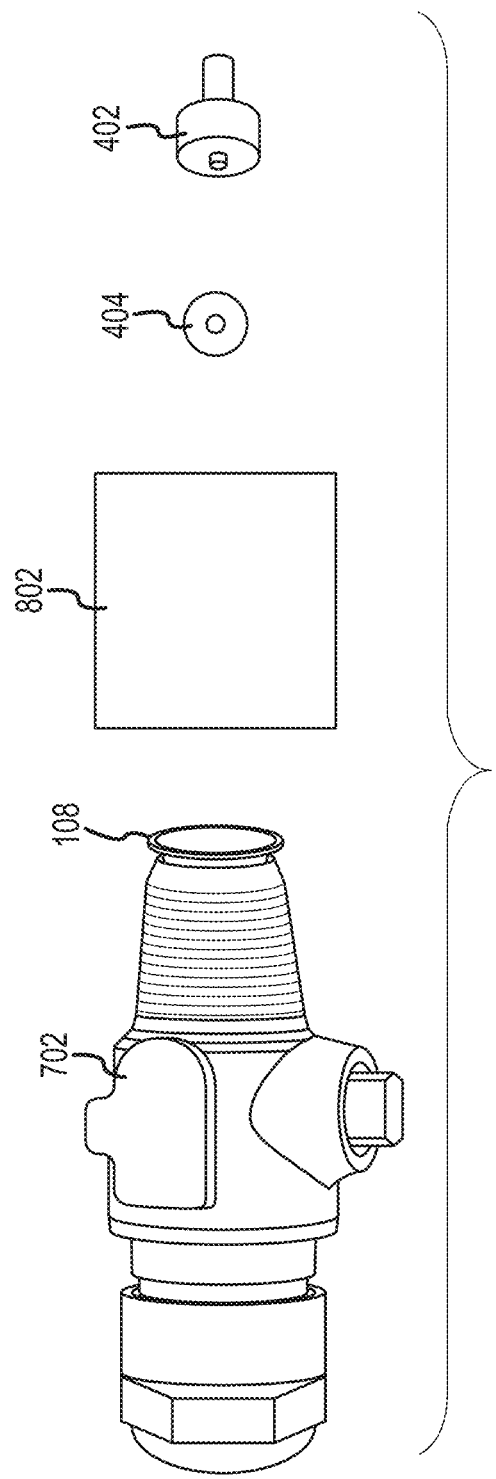

SYSTEMS AND METHODS FOR LOCATING AND RESTORING SERVICE LINES IN PIPELINE REHABILITATION

CROSS-REFERENCE TO RELATED APPLICATIONS

This application is a continuation of U.S. patent application Ser. No. 12/363,782, filed on Feb. 1, 2009, which claims the benefit of U.S. Provisional Patent Application No. 61/025,627, filed Feb. 1, 2008, which are both herein incorporated by reference in their entireties.

FIELD

Embodiments of the present invention relate generally to pipeline rehabilitation, and more specifically to locating and restoring service lines in pipeline rehabilitation.

BACKGROUND

After time, pipelines often suffer from corrosion of the inner diameter and/or minor cracking and/or leakage. Such pipelines must often be replaced or rehabilitated. Replacement often involves the movement or destruction of aboveground structures, such as roadways or sidewalks. Rehabilitation, on the other hand, may permit a new inner diameter of the pipe to be created using the existing pipeline as an outer shell, which may eliminate the need to dig up large sections of existing pipeline and/or water mains, and which may involve significant cost savings over replacement. Pipelines have numerous service lines which branch off from the main pipeline.

SUMMARY

Embodiments of the present invention relate to improvements in the locating and restoring of service in fluid bearing pipelines. Embodiments of the present invention include a system for locating and restoring service lines during pipeline restoration. According to some embodiments of the present invention, the system includes a movable cart, a plug with a marking magnet, and an attachment part. In some embodiments of the present invention, the movable cart is deployed along the inside of a pipeline. In some embodiments, the attachment part is movably coupled to the movable cart. The attachment part is configured to install a plug into the service line at a location where the service line intersects the pipeline, according to some embodiments. In other embodiments, the attachment part is configured to mark the location of the plug in the service line and remove the plug from the service line to restore a fluid connection between the service line and the pipeline.

According to embodiments of the present invention, the system has a plug installer which couples with the attachment part. In some embodiments, the plug installer is configured to install a plug into service lines at a location where the service line intersects the pipeline.

According to embodiments of the present invention, the system has a plug locator which couples with the attachment part. In some embodiments, the plug locator is configured to mark the location of a plug by sensing a marking magnet within the plug.

According to embodiments of the present invention, the system has a plug remover which couples with the attachment part. In some embodiments, the plug remover is configured to remove the plug from the service line so as to restore a fluid connection between the service line and the pipeline.

Embodiments of the present invention include a method for locating and restoring service lines during pipeline restoration. According to some embodiments, the method includes: providing a plug with a marking magnet, installing the plug into a service line running off of a pipeline, installing a tubular liner within the pipeline by filling a space between the tubular liner and the pipeline with grout, marking a location for the plug using a plug locator, and removing the plug from the service line to restore a fluid connection between the service line and the pipeline.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 14a illustrates an end section of a service line coupled with a plug, a section of a tubular liner, a movable magnet, and a plug locator, according to embodiments of the present invention.

Figure 1:
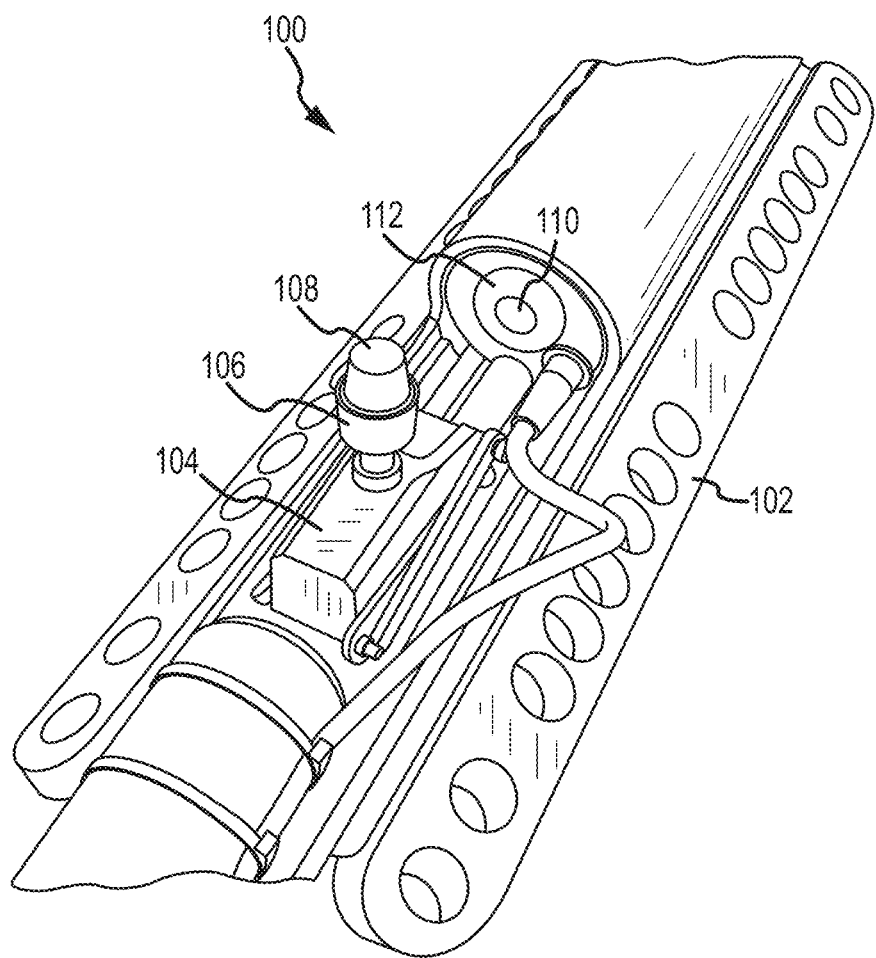
FIG. 1 illustrates a system for locating and restoring service lines during pipeline restoration, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention relate to improvements in the locating and restoring of service lines of fluid-bearing pipelines such as, for example, water mains during pipeline restoration. FIG. 1 illustrates a system 100 for locating and restoring service lines during pipeline restoration, according to embodiments of the present invention. According to embodiments of the present invention, system 100 includes a movable cart 102 and an attachment part 104 associated with the movable cart 102. Attachment part 104 may be coupled with various mechanism and tools which will be later described. According to embodiments of the present invention the system 100 also includes plug installer 106, coupled with attachment part 104, and plug 108. As used herein, the term "coupled" is used in its broadest sense to refer to elements which are connected, attached, and/or engaged, either directly or integrally or indirectly via other elements, and either permanently, temporarily, or removably. As used herein, the term "service line" is used in its broadest sense to refer any type of pipe, hose, line, or other system for fluid or gas movement.

According some embodiments of the present invention, the movable cart 102 is a three axis movable motor assembly positioned on a skid lift mechanism. According to some embodiments, the three axis motor assembly includes a drill with a bit holder and a drill motor. Various attachments may be secured by the bit holder. A chuck or a drill bit holder are exemplary embodiments of attachment part 104, according to which the attachment part may be moved and rotated in three axis of direction. According to embodiments of the present invention, the system 100 also includes a lighting means 112 and a camera 110 such that the movements and location of system 100 may be determined and controlled during use.

Figure 2:
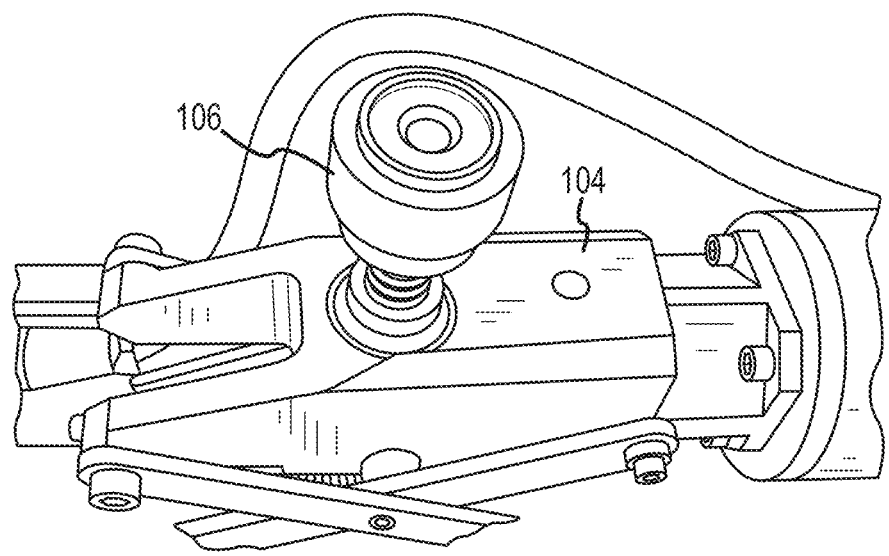
FIG. 2 illustrates an attachment part coupled with a plug installer, according to embodiments of the present invention.

FIG. 2 illustrates a close up view of attachment part 104 which is associated with the movable cart 102, according to embodiments of the present invention. In some embodiments of the present invention, attachment part 104 may be coupled with plug installer 106 as is shown in FIG. 2.

Figure 3:
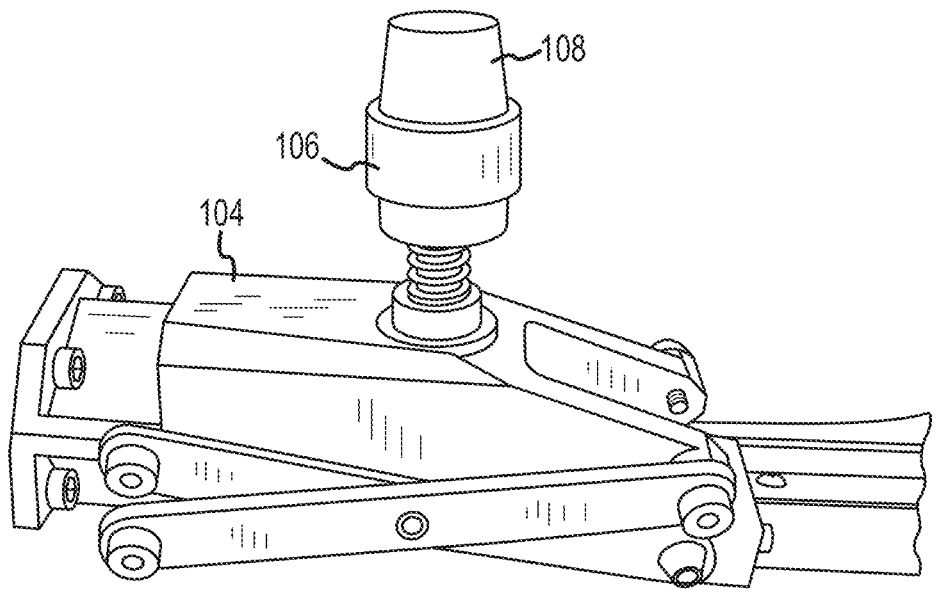
FIG. 3 illustrates an attachment part coupled with a plug installer and a plug, according to embodiments of the present invention.

FIG. 3 is illustrates attachment part 104 coupled with plug installer 106 which is shown with a plug 108, according to embodiments of the present invention. The plug installer, for example, has an attachment side coupled to the attachment part 104 and an upper side configured to retain a plug 108. The upper side of plug installer 106 has a raised circular lip which grips the interior edge of plug 108 such that plug 108 remains on the upper side of plug installer 106 until plug is transferred into a service line 702 (as shown and described with respect to FIGS. 11a-11d, below). According to some embodiments of the invention, plug 108 is a tapered polyethylene plug such as Lawson Products part number 90805 or 90815. Plug 108 may be of various diameters, materials, and shapes such that it is configured to seal service lines of a pipeline at the location where the service lines meet the pipeline. Other embodiments of plug 108 are described below.

Figure 4:
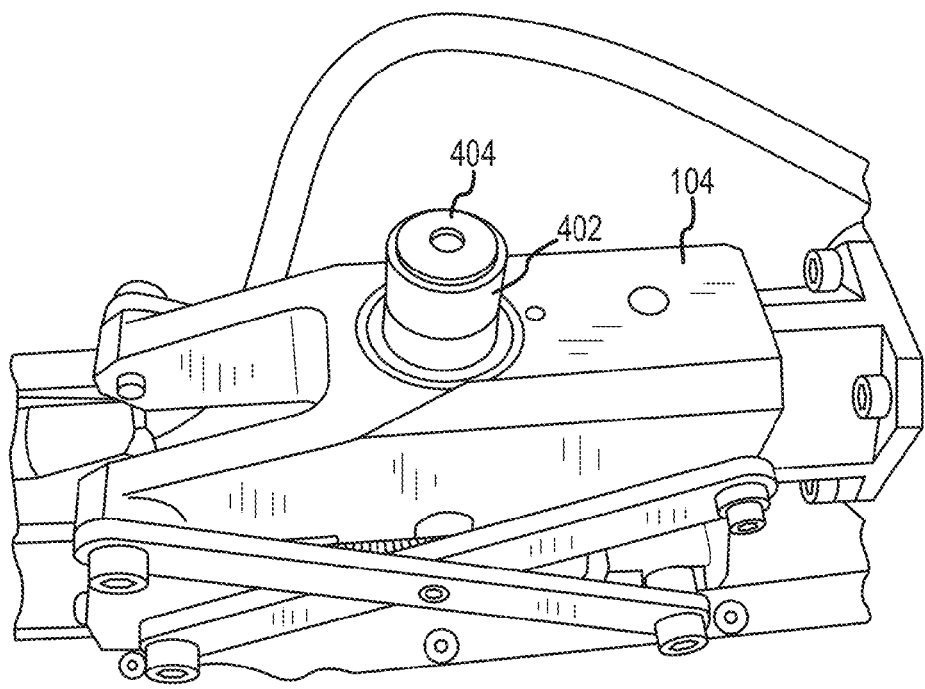
FIG. 4 illustrates an attachment part coupled with a plug locator which is associated with a movable magnet, according to embodiments of the present invention.
Figure 5:
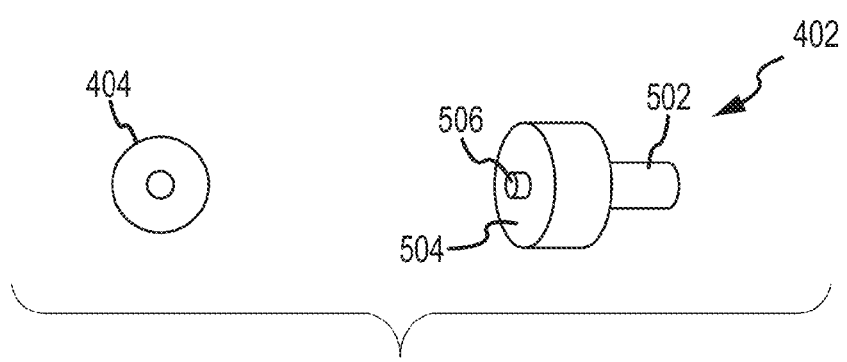
FIG. 5 illustrates a plug locator with a movable magnet separated from the plug locator, according to embodiments of the present invention.

FIG. 4 illustrates plug locator 402 of system 100, where plug locator 402 is coupled with attachment part 104, according to embodiments of the present invention. Plug locator 402 has a movable magnet 404 as shown in FIGS. 4 and 5 which may be used to mark the location of previously installed plugs 108. Other embodiments of plug locator 402 are described below.

Figure 6:
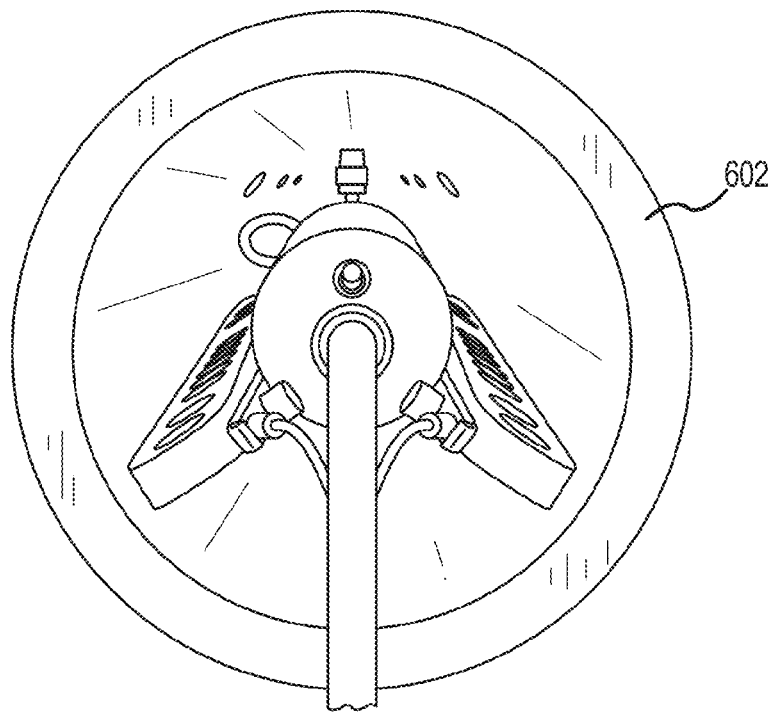
FIG. 6 illustrates a system for locating and restoring service lines during pipeline restoration while the system is on the interior of a pipeline, according to embodiments of the present invention.
Figure 7:
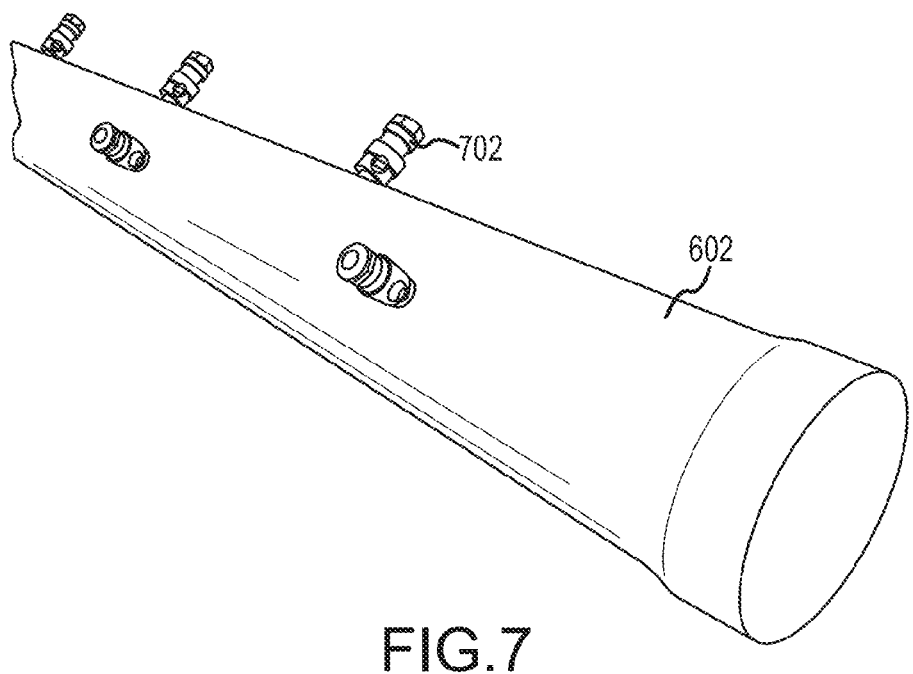
FIG. 7 illustrates the outside of a pipeline having service lines, according to embodiments of the present invention.

FIG. 6 illustrates system 100 deployed along the inside of pipeline 602, according to embodiments of the present invention. FIG. 7 illustrates pipeline 602 with service lines 702 branching off from pipeline 602.

Figure 8:
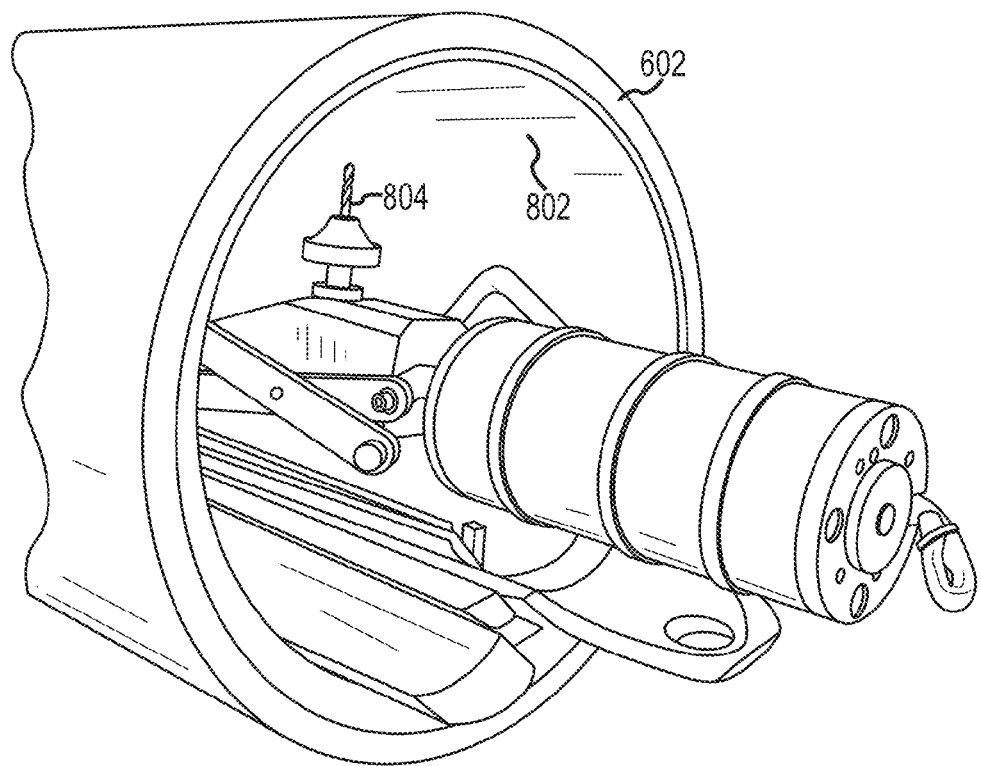
FIG. 8 illustrates a system for locating and restoring service lines during pipeline restoration after a tubular liner is placed within a pipeline, according to embodiments of the present invention.

FIG. 8 illustrates system 100 deployed along the inside of pipeline 602, according to embodiments of the present invention. According to some embodiments of the present invention, plug remover 804 couples with attachment part 104. FIG. 8 also illustrates liner 802, according to embodiments of the present invention. According to embodiments of the present invention, a pipeline 602 may be rehabilitated by inserting a liner 802 therethrough, and cementing the liner 802 to an inside diameter of pipeline 604 with grout. Liner 802 may be, for example, a liner with grout hooks as described in U.S. Pat. No. 6,167,913, issued on Jan. 2, 2001, and entitled "Pipe Liner, a Liner Product and Methods for Forming and Installing the Liner," which is incorporated by reference herein for all purposes. Liner 802 may be formed of an extruded medium-density polyethylene material or other polymer or polymer-like material; for example, liner 802 may be formed from a sheet of material created by Velcro® Europe S.A. According to some embodiments of the present invention, liner 802 conforms to ASTM-D1248: Type 11, Class B, Category 5 standards, and based upon ISO classifications, may be classified as PE80 or PE-100 material. According to some embodiments of the present invention, liner 802 is substantially resistant to ultraviolet radiation and is designed for potable water applications.

According to some embodiments of the present invention, liner 802 has a tensile strength at breakage of approximately 30 Mpa, an elongation at breakage of approximately 1,100%, a flexural modulus of approximately 700 Mpa, a hardness of approximately 60 Shore D, a Vicat softening point of approximately 126° Celsius, a density at twenty-three degrees Celsius of approximately 942 kilograms per cubic meter, a weight of approximately 450 kilograms per square meter (plus or minus fifty grams per square meter), and a hook concentration of approximately twenty per square centimeter (plus or minus ten percent).

According to embodiments of the present invention, a pipeline 602 may be rehabilitated by inserting a liner 802 therethrough, for example, by the method and system described in U.S. patent application Ser. No. 11/842,933 filed on Aug. 21, 2007, and entitled "Systems and Methods for Pipeline Rehabilitation Installation," which is incorporated by reference herein for all purposes.

According to other embodiments of the present invention, a pipeline 602 may be rehabilitated by inserting a liner 802 therethrough, for example, by the method and system described in U.S. patent application Ser. No. 11/842,937 filed on Aug. 21, 2007, and entitled "Systems and Methods for Installation Inspection in Pipeline Rehabilitation," which is incorporated by reference herein for all purposes.

Figure 9A:
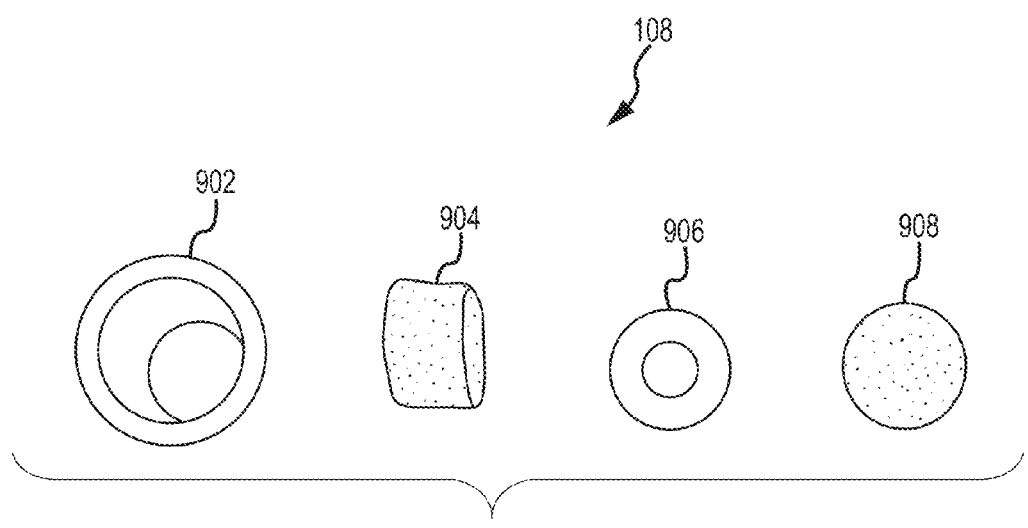
FIG. 9a illustrates parts of an exemplary plug according to embodiments of the present invention.
Figure 9B:
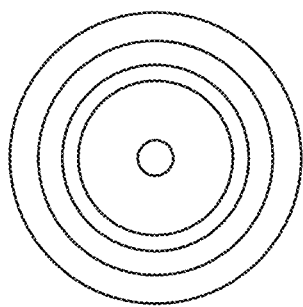
FIG. 9b illustrates an exemplary plug according to embodiments of the present invention.
Figure 9C:
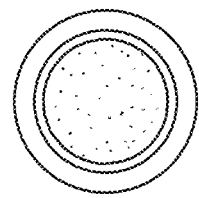
FIG. 9c illustrates an exemplary plug according to embodiments of the present invention.

FIGS. 9a-9c illustrates a plug 108 according to embodiments of the present invention. FIG. 9a shows an exploded view of an exemplary plug 108 which may have a shell 902, a first foam layer 904, a second foam layer 908, and a marking magnet 906. According to embodiments of the invention the shell 902 is hollow and a marking magnet 906 is placed inside the hollow shell. For example, as is shown in FIGS. 9b & 9c, a first foam layer 904 may be placed in the shell 902, then marking magnet 906 may be placed on top of the first foam layer 904, and lastly a second foam layer 908 is placed on top of marking magnet 906. According to embodiments of the present invention the marking magnet 906 may be sealed in plug 108 using a silicon adhesive, or other glue or adhesive. According to embodiments of the present invention, plug 108 may be formed using a Room Temperature Vulcanizer (RTV). The marking magnet may be, for example, a neodymium magnet such as CMS Magnetics part number NR005-40NM.

According to embodiments of the present invention, system 100 may be used to restore service lines 702 during pipeline rehabilitation by installing one or more plugs 108 into the service lines 702 off of the pipeline 602 such that any gap between the service line and the interior space of pipeline 602 is sealed off. Plug 108, for example, may be installed into service lines by coupling plug 108 with plug installer 106 which is in turn coupled with the attachment part 104 of system 100. System 100 may then be deployed within a pipeline 602 to locate service line 702 entrance points into pipeline 602. Movable cart 102 may, for example, locate service lines 702 using lighting means 112 and camera 110. Other locating means may be used such as, for example, an optical, electrical, magnetic, and/or sonar locating means. Movable cart 102 may be moved within pipeline 602. Attachment part 104 may be moved and rotated in three axes of direction to place plug 108 into the opening of service line 702 such that the opening is sealed. According to embodiments of the invention, the plug locator 402 and also the plug remover 804 may be similarly moved and rotated in three axes of direction within the pipeline 602 as described above using the movable cart 102 and the attachment point 104 of system 100.

Figure 10:
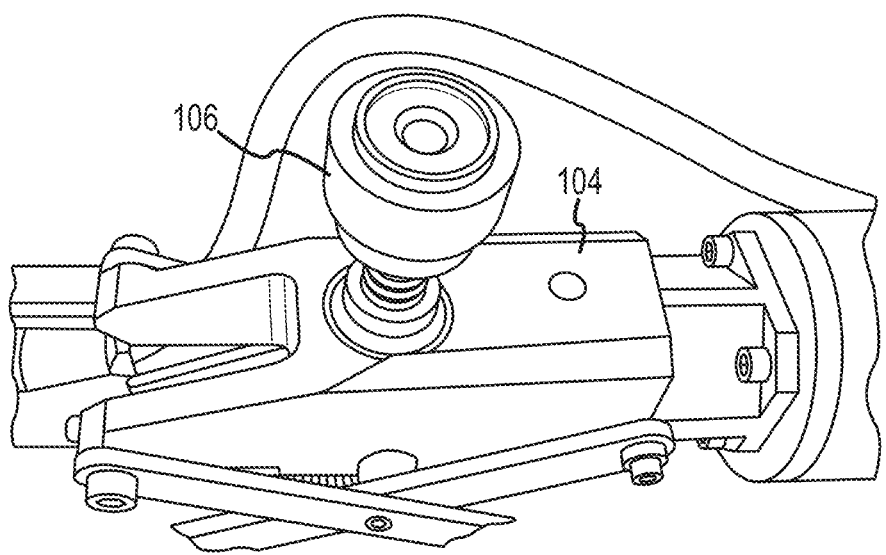
FIG. 10 illustrates a plug installer coupled with an attachment part, according to embodiments of the present invention.
Figure 11A:
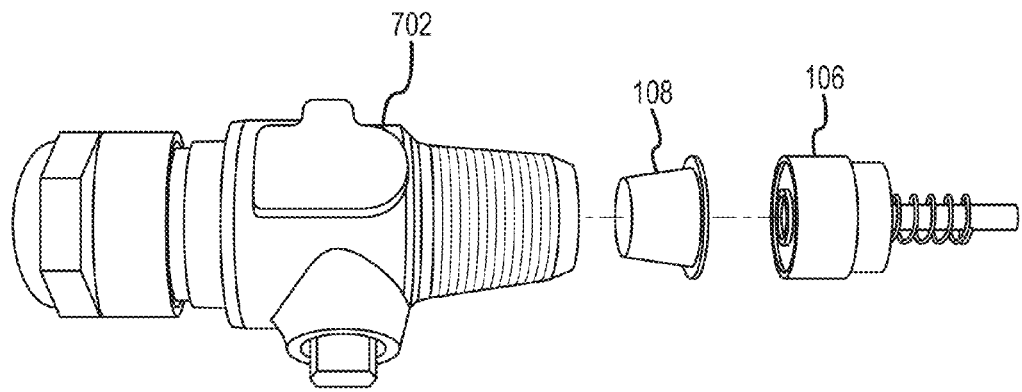
FIG. 11a illustrates an end section of a service line, a plug, and a plug installer, according to embodiments of the present invention.
Figure 11B:
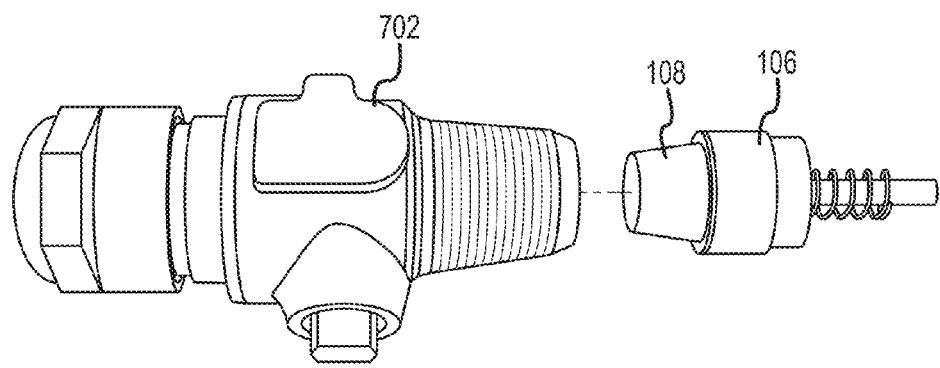
FIG. 11b illustrates an end section of a service line and a plug associated with a plug installer, according to embodiments of the present invention.
Figure 11C:
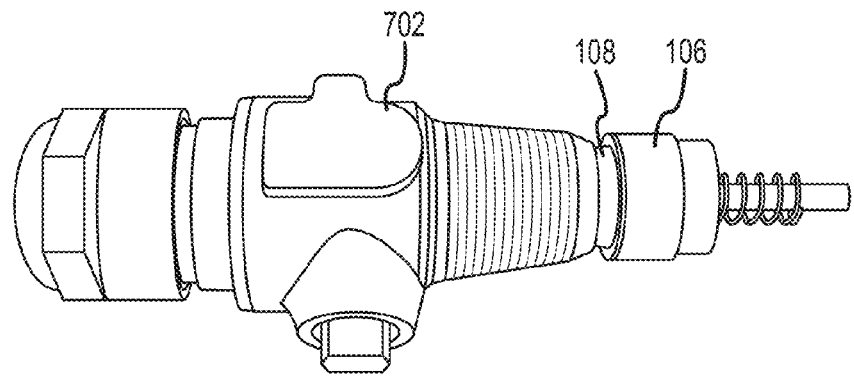
FIG. 11c illustrates a plug which is coupled with both an end section of a service line and a plug installer, according to embodiments of the present invention.
Figure 11D:
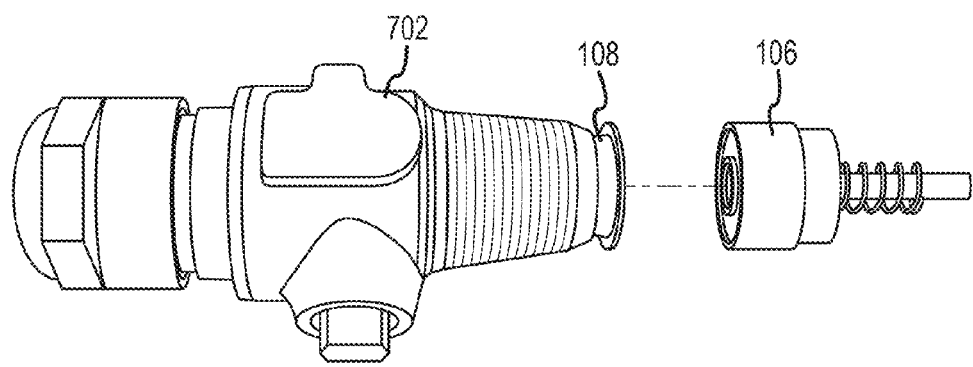
FIG. 11d illustrates a plug installer and a plug coupled with an end section of a service line, according to embodiments of the present invention.

According to embodiments of the present invention, a plug 108 may be installed into a service line 702 using the plug installer 106 coupled to the attachment part 104 as shown in FIG. 10. According to embodiments of the present invention, a plug 108 may be installed into a service line 702 through the steps illustrated in FIGS. 11a-11d in which pipeline 602 and attachment part 106 are omitted for simplification. According to embodiments of the present invention, plug 108 is coupled with plug installer 106 as illustrated in FIG. 11b. Plug is then coupled with the open end of service line 702 such that the opening of the service line to the pipeline 602 (not shown) is sealed as illustrated in FIG. 11c. Plug installer 106 is then moved radially away from open end of service line 702 disengaging plug installer 106 from plug 108 leaving plug 108 coupled with service line 702 as illustrated in FIG. 11d.

According to embodiments of the present invention, after plug 108 is installed into service line 702, the pipeline 602 may be rehabilitated using a liner 802.

According to embodiments of the present invention, the location of plug 108 may be determined using plug locator 402. According to some embodiments of the present invention, the plug locator 402 determines the location of a plug 108 by detecting the location of marking magnet 906 of plug 108 through the installed liner 802. According to embodiments of the present invention, once the location of marking magnet 906 is determined, that location will be marked. The marking of the location of magnet 906 may be accomplished by, for example but not limited to: creating a dimple or indent in the liner 702 with plug locator 402; creating a visual marking with pen, pencil, or marker; or leaving a separate magnet at the location magnetically engaged with marking magnet 906.

Figure 12A:
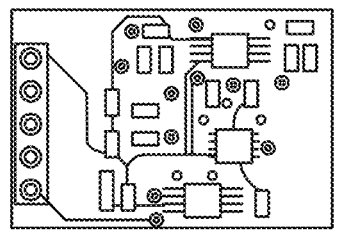
FIG. 12a illustrates an electromagnetic sensor, according to embodiments of the present invention.
Figure 12B:
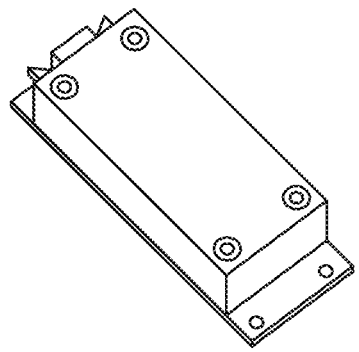
FIG. 12b illustrates an electromagnetic sensor, according to embodiments of the present invention.
Figure 12C:
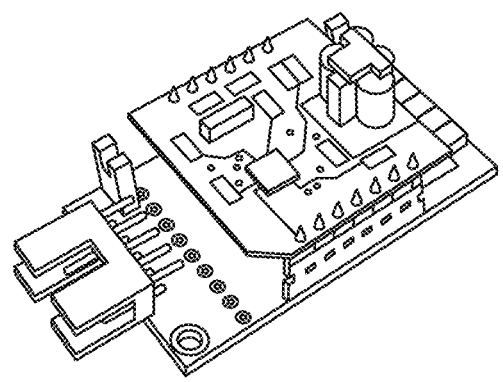
FIG. 12c illustrates an electromagnetic sensor, according to embodiments of the present invention.
Figure 13A:
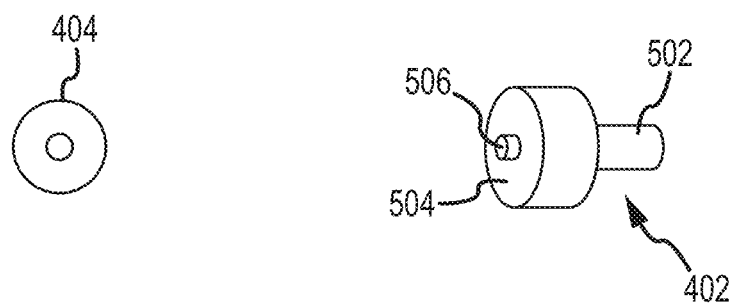
FIG. 13a illustrates a movable magnet and a plug locator, according to embodiments of the present invention.
Figure 13B:
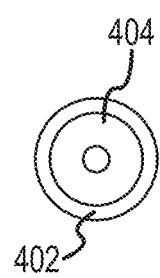
FIG. 13b illustrates a movable magnet coupled with a plug locator, according to embodiments of the present invention.

According to some embodiments of the present invention, the plug locator has an electromagnetic sensor as shown in FIGS. 12a-12c which may be used to locate marking magnet 906 of plug 108. For example, FIG. 12a illustrates a PNI Corporation's MicroMag3 integrated three-axis magnetic field sensing module, FIG. 12b illustrates a Honeywell HMC1052L magnetic sensor, and FIG. 12c illustrates a Honeywell HMR2300 three-axis digital magnetometer.

According to some embodiments of the present invention, the plug locator 402 may include a movable magnet 404 as is illustrated in FIGS. 4, 5, 13a, and 13b. For example, the plug locator 402 may have an attachment side 502 coupled with attachment part 104 and an upper side 504 configured to engage movable magnet 404. In one embodiment the upper side of plug locator 402 has a central raised bump 506 configured to engage a hole in the center of movable magnet 404. According to embodiments of the present invention the movable magnet 404 and the plug locator 402 may be magnetically coupled, or may be nonmagnetically coupled.

Figure 14B:
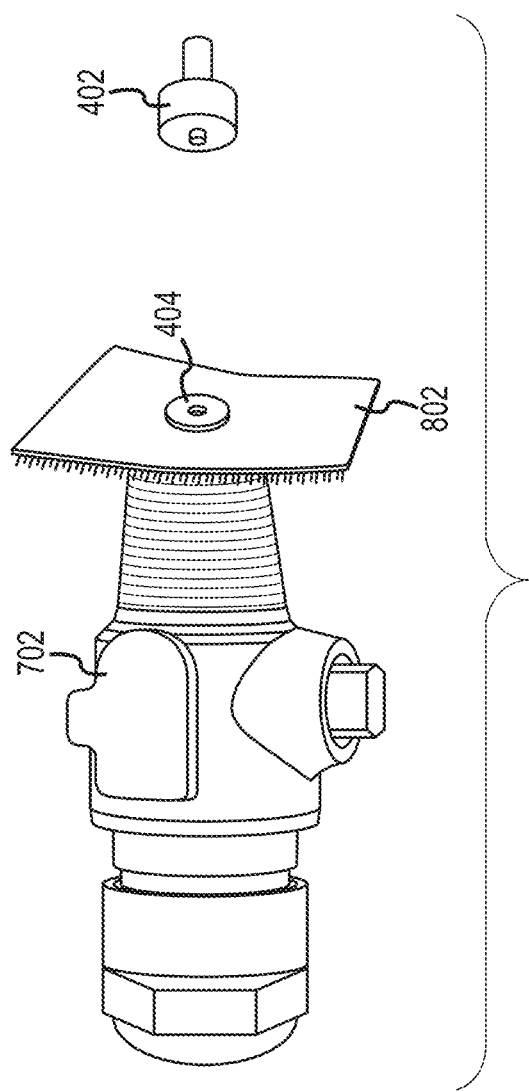
FIG. 14b illustrates an end section of a service line coupled with a plug, and a movable magnet magnetically coupled with the plug with a section of tubular liner between the plug and the movable magnet, according to embodiments of the present invention.

FIG. 14a illustrates a plug locator 402, movable magnet 404, liner 802, and a plug 108 inserted inside the opening of service pipe 702, according to embodiments of the present invention. According to embodiments of the invention, after the liner 802 has been installed within the pipeline 602 as described above, the location of a plug 108 may be determined by moving the movable magnet 404 which is coupled with plug locator 402 around the interior volume of pipe 702. The plug locater 402 may be moved while coupled to the attachment part 104 through movement of the movable cart 102. According to embodiments of the present invention as the plug locater 402 passes by a plug 108 under the liner 802, the movable magnet 404 will disengage from the plug locater 402 and magnetically engage with marking magnet 906 which is located within plug 108. The engagement of marking magnet 906 and plug locater 402 is illustrated in FIG. 14b. Multiple marking magnets 906 may be used to mark the location of multiple plugs 108.

According to embodiments of the present invention, after the location of one or more plugs 108 is determined and marked, the one or more plugs 108 are removed from the service lines 702 using plug remover 804. The plug remover 804 may be moved to the location of plugs 108, for example, through the use of movable cart 102, camera 110 and lighting means 112 to determine the marked locations of plugs 108.

Figure 15A:
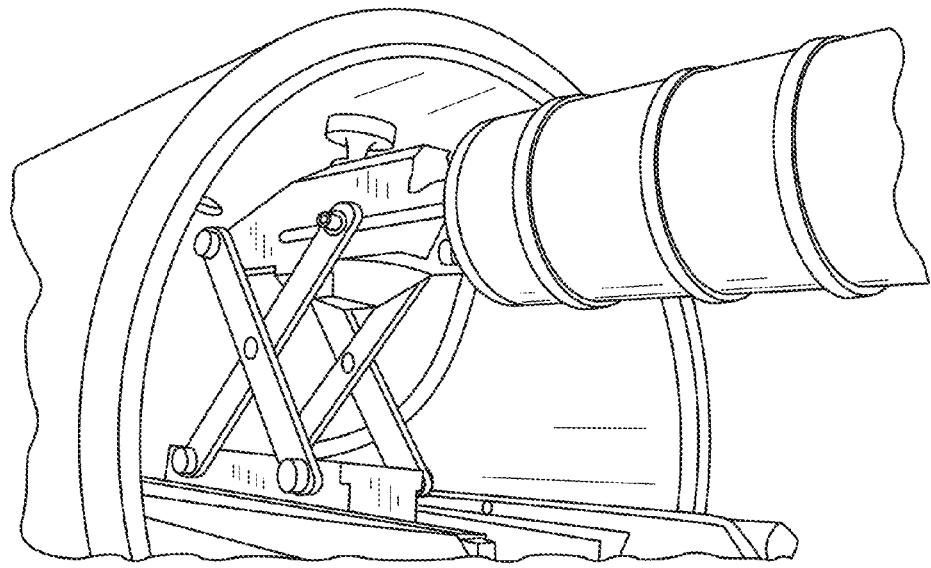
FIG. 15a illustrates a system for locating and restoring service lines during pipeline restoration with a plug remover drilling a hole through a tubular liner into a service line, according to embodiments of the present invention.
Figure 15B:
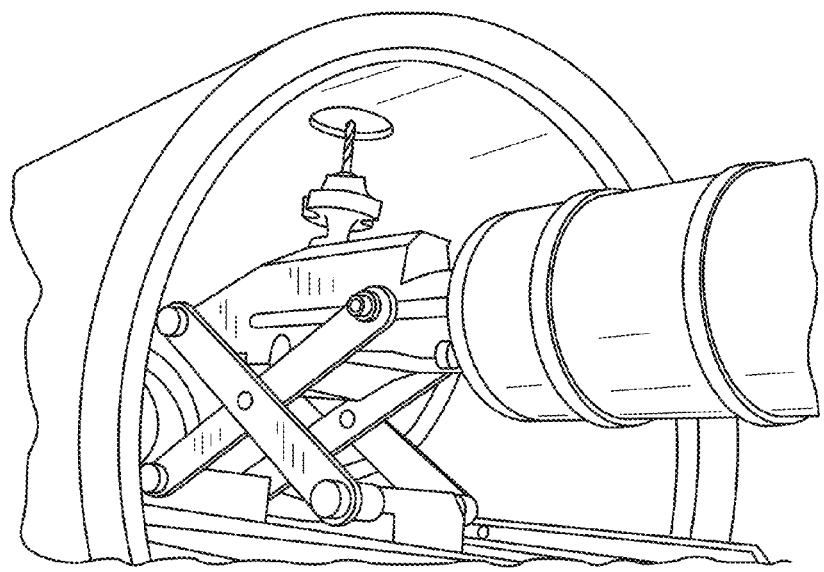
FIG. 15b illustrates a system for locating and restoring service lines during pipeline restoration after a plug remover has drilled a hole through a tubular liner into a service line, according to embodiments of the present invention.
Figure 15C:
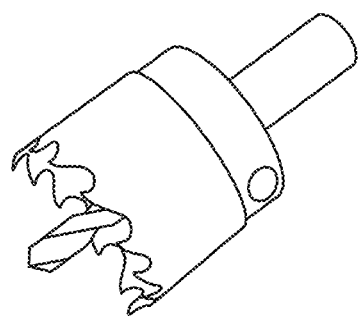
FIG. 15c illustrates an embodiment of plug remover.

According to embodiments of the present invention, plug remover 804 may be coupled with attachment part 104. Attachment part 104 may be, for example, a drill bit holder which permits the attachment part 104 to move and rotate in three axes of direction. An exemplary plug remover 804 may be a drill bit, such as, but not limited to: a circular drill bit, a circular drill bit with a centering device which may drill through a hole in movable magnet 404, and/or the drill bit illustrated in FIGS. 15a & 15b. FIG. 15c illustrates an embodiment of plug remover 804.

According to embodiments of the present invention, plug remover 804 cuts through the liner 802 and the plug 108 such that an opening is created between the interior of the pipeline 602 and the interior of service lines 702. After the opening is created as is shown in FIG. 15b, the plug falls through the opening due to gravity, according to embodiments of the present invention. According to other embodiments of the invention, the plug is removed from the opening by having a plug remover magnet attached to plug remover 804 which magnetically couples to plug 108, specifically marking magnet 906, such that as the plug remover is pulled out of the opening, the plug 108 will also be magnetically coupled to plug remover 804 and be removed from the opening simultaneously with the plug remover 804.

Figure 16:
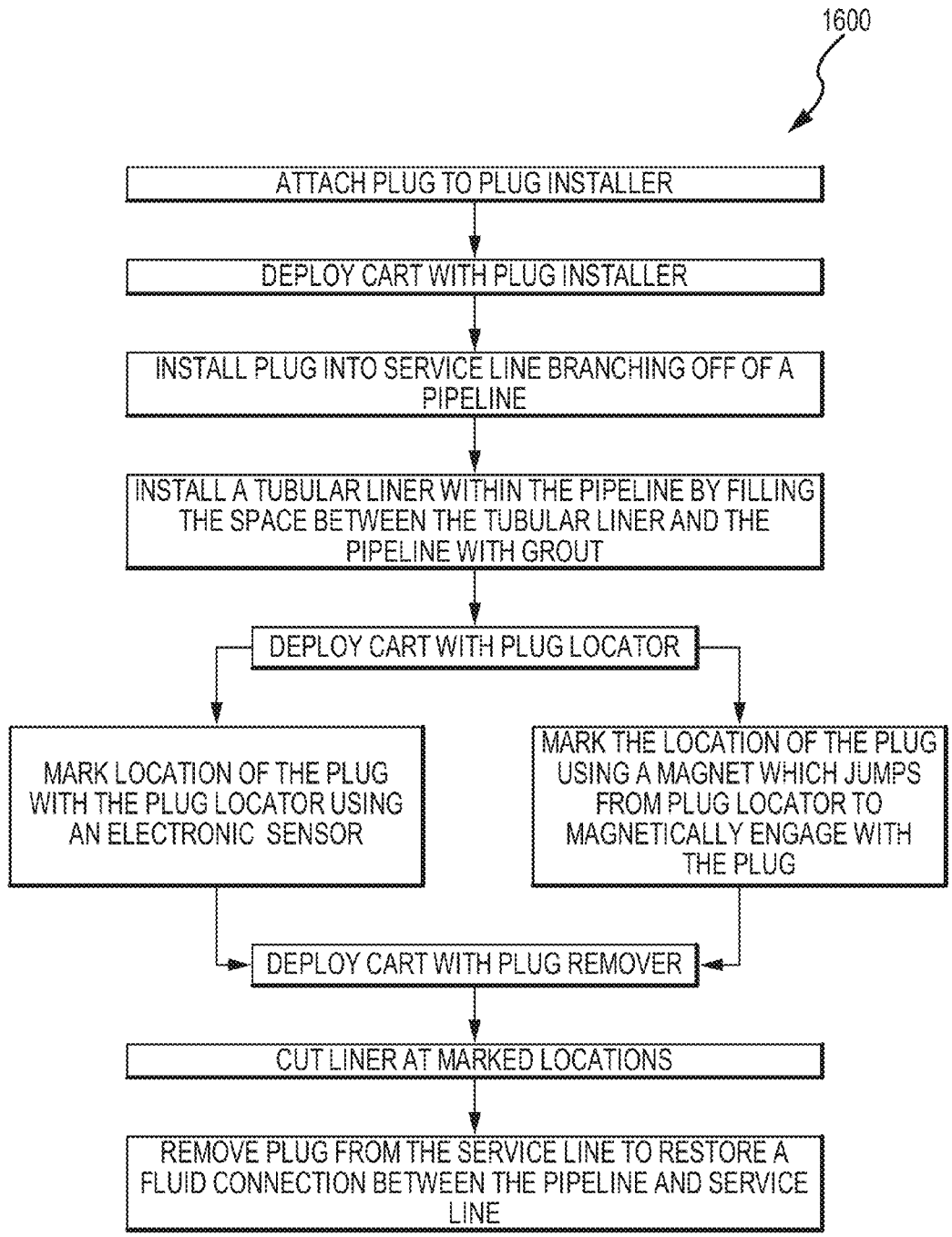
FIG. 16 illustrates a method for locating and restoring service lines during pipeline restoration, according to embodiments of the present invention.

FIG. 16 depicts a flow diagram 1600 illustrating a method for locating and restoring service lines in pipeline rehabilitation, according to embodiments of the present invention. A movable cart 102 may be deployed with a pipeline 602. One or more plugs 108 may be installed into service lines 702 branching from a pipeline 602. A tubular liner 802 may be installed within pipeline 602 by filling the space between the tubular liner 802 and the pipeline 602 with grout. The movable cart 102 may then be deployed with a plug locator 402. The location of plugs 108 may be marked using a plug locator 402 and a movable magnet 404. The location of the plugs may be marked using a plug locator 402 and an electronic sensor. After the plugs 108 have been marked, the movable cart 102 may then be deployed with plug remover 804. The tubular liner 802 may then be cut at the marked locations The plugs 108 may be removed from the service lines 702 to restore a fluid connection between the pipeline 602 and service line 702, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for locating and restoring service lines in pipeline restoration, the method comprising:
    inserting a plug into a service line opening, wherein the plug comprises a marking magnet;
    installing a tubular liner within the pipeline; and
    locating the plug by locating the marking magnet;
    wherein locating the plug comprises:
    providing a movable magnet on a cart; and
    moving the cart within the pipeline until the movable magnet moves toward the marking magnet.

2. The method of claim 1, wherein locating the plug further comprises moving the cart within the pipeline until the movable magnet jumps from the cart onto an inside of the tubular liner at or near a location of the plug.

3. The method of claim 2, further comprising removing the plug from the service line opening to restore a fluid connection between the service line and the pipeline.

4. The method of claim 3, wherein removing the plug comprises drilling a hole through the tubular liner.

5. The method of claim 4, wherein the hole is a first hole, wherein the movable magnet comprises a second hole, and wherein drilling the first hole through the tubular liner comprises inserting a drill bit into the second hole.

6. The method of claim 4, wherein the hole is a first hole, wherein the movable magnet comprises a second hole, and wherein drilling the first hole through the tubular liner comprises inserting a centering device of a circular drill bit into the second hole.

7. A method for locating and restoring service lines in pipeline restoration, the method comprising:
    inserting a plug into a service line opening, wherein the plug comprises a marking magnet;
    installing a tubular liner within the pipeline;
    after the tubular liner has been installed within the pipeline, determining a location of the plug by detecting a presence of a magnetic field of the marking magnet,
    wherein detecting the presence of the magnetic field of the marking magnet comprises exposing a movable magnet in the pipeline to the magnetic field.

* * * * *